United States Patent [19]
King et al.

[11] Patent Number: 5,961,676
[45] Date of Patent: *Oct. 5, 1999

[54] HARD BAG DOOR WITH AIR DIRECTING ARRANGEMENT

[75] Inventors: Douglass A. King, North Canton; Raymond L. Lawer, Millersburg; David P. Parks, North Canton; Kurt D. Harsh, North Canton; Douglas C. Barker, North Canton; Jeffrey S. Louis, Green; Anson W. Telford, North Canton; David B. Rennecker, Canton, all of Ohio

[73] Assignee: The Hoover Company, North Canton, Ohio

[*] Notice: This patent is subject to a terminal disclaimer.

[21] Appl. No.: 09/078,372

[22] Filed: May 13, 1998

Related U.S. Application Data

[63] Continuation-in-part of application No. 08/871,279, Jun. 9, 1997, Pat. No. 5,863,309.

[51] Int. Cl.⁶ .......................... B01D 45/08; B01D 46/10
[52] U.S. Cl. ...................... 55/334; 15/347; 15/353; 55/368; 55/413; 55/416; 55/439; 55/DIG. 3
[58] Field of Search .................. 55/DIG. 3, 361, 55/368, 373, 334, 439, 437, 410, 413, 414, 416; 15/347, 350, 353

[56] References Cited

U.S. PATENT DOCUMENTS

| | | | |
|---|---|---|---|
| 1,992,042 | 2/1935 | Rurka | 183/51 |
| 1,997,720 | 4/1935 | Emmons | 183/52 |
| 2,272,394 | 2/1942 | Armstrong | 183/51 |
| 3,279,157 | 10/1966 | Andersson-Sason et al. | 55/357 |
| 3,491,519 | 1/1970 | Ettridge | 55/373 |
| 3,550,182 | 12/1970 | Kivela | 15/323 |
| 3,632,905 | 1/1972 | Boyd | 55/DIG. 3 |
| 3,971,643 | 7/1976 | Hufton | 55/372 |
| 4,406,678 | 9/1983 | Neugart | 55/372 |
| 4,627,858 | 12/1986 | Jacob | 55/126 |
| 4,724,574 | 2/1988 | Bowerman et al. | 55/DIG. 3 |
| 4,749,386 | 6/1988 | Strohmeyer et al. | 55/131 |
| 5,159,738 | 11/1992 | Sunagawa et al. | 55/DIG. 3 |
| 5,228,169 | 7/1993 | Stein et al. | 15/351 |
| 5,230,722 | 7/1993 | Yonkers | 55/337 |
| 5,685,894 | 11/1997 | Bowerman et al. | 55/DIG. 3 |
| 5,690,713 | 11/1997 | Bowerman et al. | 55/DIG. 3 |
| 5,867,863 | 2/1999 | McCormick | 15/351 |

FOREIGN PATENT DOCUMENTS

| | | |
|---|---|---|
| 406271 | 1/1969 | Australia . |
| 639928 | 4/1962 | Canada . |
| 278180 B6 | 9/1993 | Czech Rep. . |
| 92A000095 | 5/1992 | Italy . |
| 1072791 | 6/1967 | United Kingdom . |

OTHER PUBLICATIONS

Photographs of Kenmore Progressive Vacuum Cleaner—Received Oct. 09, 1997.
Photographs of Sharp Twin Energy Vacuum Cleaner—Received Nov. 05, 1997.

(List continued on next page.)

*Primary Examiner*—Duane S. Smith
*Attorney, Agent, or Firm*—A. Burgess Lowe; Thomas R. Kingsbury

[57] ABSTRACT

A hard bag cleaner door is disclosed having air directing rib vanes integral with its inner surface. These vanes take the form of, alternately, angled J-shaped ribs and short straight interleaved ribs. All the ribs are stepped so that the flow passage for air moving along the interior side of the bag door diverges as more bag air is introduced to it so that it directs efficiently air flow to a lower disposed motor-fan section of an adjoining hard bag portion. In a second embodiment, an exhaust opening is formed in the hard bag cleaner door below the air directing rib vanes and is covered by a final filter and final filter door. The air moving along the interior side of the bag door is directed out the exhaust opening, through the final filter which filters small dust particles which may be present in the exhaust air and out vent openings formed in the final filter door.

22 Claims, 14 Drawing Sheets

OTHER PUBLICATIONS

Photograph of Panasonic Excel Upright—Recieved Feb. 1992.

Photograph of Panasonic Power Wave Upright—Received Aug. 1997.

Photograph of Eureka Excalibur Canister—Received Mar. 1995.

Photograph of Eureka The Boss Excalibur Upright—Received Apr. 1996.

Photograph of Rowenta Allegro Microclean Canister—Received Mar. 1994.

Photograph of eureka Victory Powerline Plus Bag Door—Received Dec. 1995.

HARD BAG DOOR WITH AIR DIRECTING ARRANGEMENT

This application is a continuation-in-part of application Ser. No. 08/871,279, filed Jun. 9, 1997, now U.S. Pat. No. 5,863,309.

BACKGROUND OF THE INVENTION

1. Field of the Invention

This invention relates to floor care appliances and, more specifically, to an airflow arrangement for a hard bag cleaner.

2. Summary of the Prior Art

The use of hard bag cleaners with air directing internal ribs in their bag cavities is well known. But, with the advent of the entrance of more cleaners having a clean air system in the marketplace, effective, efficient direction of dirt collecting bag discharge air towards such a cleaner's motor fan system has become more critical.

Effective and efficient direction of dirt collecting bag is also necessary in dirty or direct air systems to guide the airflow towards an exhaust opening formed in the hard bag cleaner. Heretofore, many direct or dirty air systems have included exhaust openings along the sides of the bag door of a hard bag vacuum cleaner which allow the exhaust from the vacuum cleaner filter bag to escape into the atmosphere. With consumers becoming more conscious about the purity of the air within their households, some vacuum cleaner manufacturers have added a final filter which filters the exhaust air emitted from the vacuum cleaner into the atmosphere. This final filter captures any minute dust particles which may have escaped the filter bag and adds another stage of filtration to the vacuum cleaner exhaust system.

Because an additional filter is added to these vacuum cleaners between the filter bag and the atmosphere outside the hard bag cleaner, it is important that vacuum cleaners with a direct air system have an effective and efficient direction of exhaust air towards the final filter to reduce turbulence and the resulting loss in the efficiency of the vacuum cleaner.

Accordingly, it would be advantageous to provide a cleaner having either a clean air system or a dirty or direct air system with an air directing arrangement which, downstream of the bag, minimized back pressures, eddy currents, noise and the like so that an efficient flow path could be established through the dirt bag cavity to provide a more effective vacuum cleaner suction air system.

It is, therefore, an object of this invention to aid in the provision of a lower energy loss airflow path from dirt bag discharge to the cleaner suction fan.

It is a further objective of the invention to aid in the perversion of a low energy loss airflow path from dirt bag discharge to an exhaust opening covered by a final filter.

It is another object of the invention to provide a series of airflow directing vanes within a hard bag cavity to guide dirt bag discharge air.

It is a further object of the invention to provide airflow guide vanes on the internal side of a panel of a hard bag cleaner.

It is an additional object of the invention to provide these guide vanes of the bag door of the hard bag cleaner.

It is a still further object of the invention to provide an improved internally vaned hard bag panel and/or bag door.

SUMMARY OF THE INVENTION

The invention is provided on the interior of a bag door of a hard bag cleaner. It consists of vaning formed by internal integral ribs disposed on the inside surface of this door. The bag door is roughly in the form of an open sided rectangle of somewhat curvilinear prismatic shape with the internal surface of this shape having the vaned ribs. A pair of medially disposed vertical ribs serve primarily for stiffening purposes. On either side of these two ribs are a series of guiding vanes formed by substantially J-shaped ribs interspersed by a series of short horizontally extending ribs. The tails of the "J" angle downwardly while the remainder of each J shape extends horizontally away from the two medial ribs towards the sides of the bag door. The J ribs are offset in a stepped manner at the center of the door so that as one approaches the bottom portions of the hard bag door a center expanding flow volume is formed on each side of the medial ribs. The short interleaved ribs also are stepped and aid to guide flow but function, more importantly, to prevent a dirt bag placed in the hard bag of the cleaner and having suction imposed on it to seal against the inner face of the hard bag door and thereby prevent air moving through it from freely flowing down along the bag door for eventual discharge from the bottom of hard bag portion of the hard bag cleaner. The J shaped ribs and the short horizontally extending ribs also extend wrappingly around the inner sides of the hard bag door, again, for air guidance and to prevent bag sealing.

In a first embodiment of the hard bag door, a series of integral short vertically and horizontally extending stepped ribs may be provided at the bottom thereof to guide the flow of air moving along the bag door forwardly to a bottom exit afforded by the hard bag portion. In a second embodiment of the hard bag door, an opening is formed in the bag door for allowing the exhaust air to flow into the atmosphere. A series of stand-off ribs extend across the opening to guide the airflow and prevent sealing of the filter bag over the opening. A final filter is held in place by a final filter door and is positioned over the opening to filter the exhaust air prior to the exhaust air flowing into the atmosphere.

The hard bag portion, although not included in this invention, itself, is also formed with vent ribs extending along its sides which, with the bag door assembled, aid in the direction of bag exhaust air and prevent side bag sealing to it. The hard bag portion also includes generally a handle mounting structure, a bag mounting boss, some vertically extending air directing ribbing and the exhaust for the bag cavity. Air flows downwardly within the hard bag portion to be discharged from its exhaust opening to flow to an integral fan-motor housing section in the first embodiment of the hard bag portion and to the exhaust opening in the second embodiment of the hard bag portion.

BRIEF DESCRIPTION OF THE DRAWINGS

Reference now may be had to the accompanying Drawings for a better understanding of the invention, both as to its organization and function, with the illustration being of preferred embodiments, but being only exemplary, and in which.

Similar numbers refer to similar parts throughout the drawings.

DETAILED DESCRIPTION OF THE INVENTION

Figure 1:
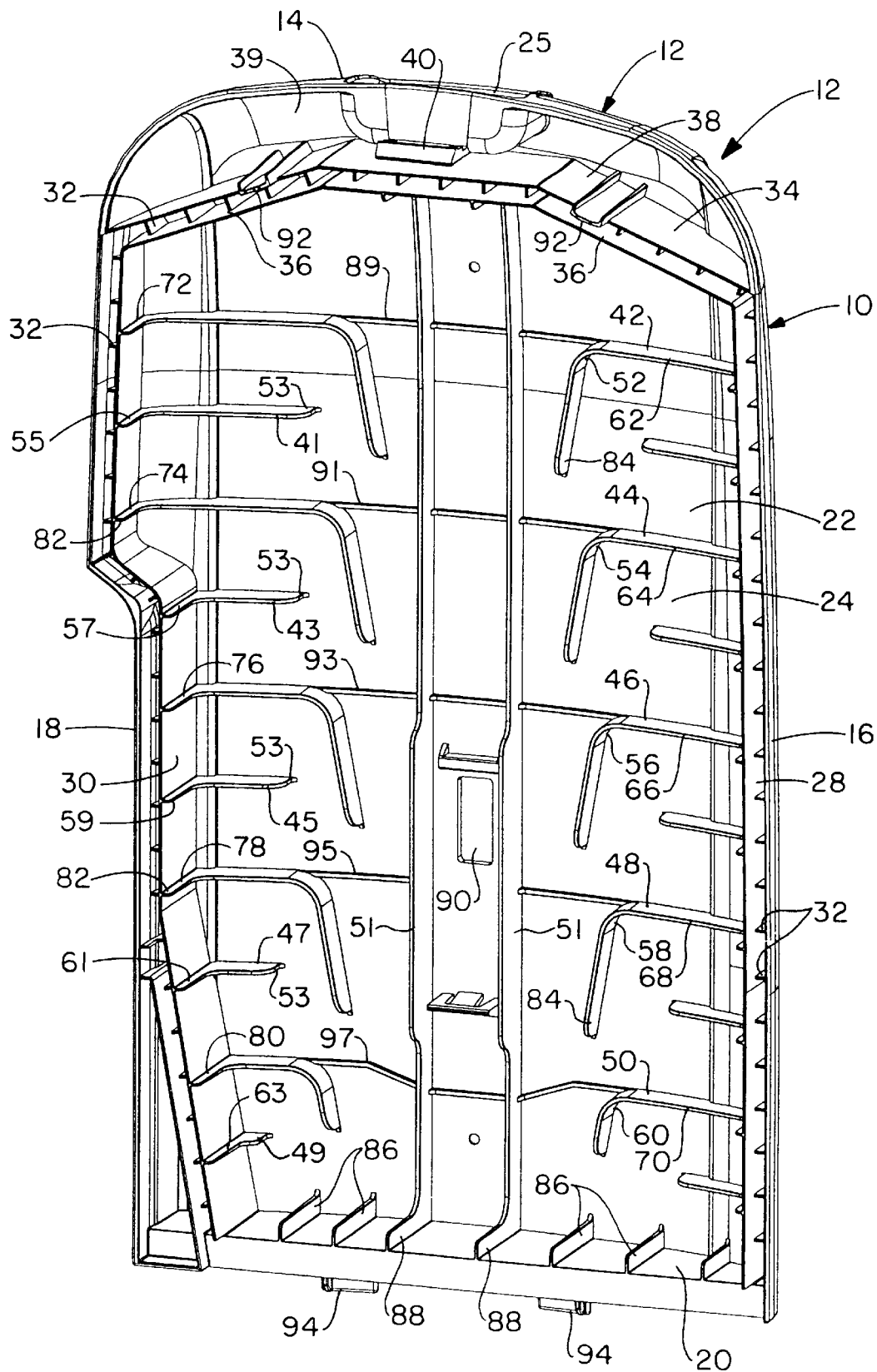
FIG. 1 is a left inside perspective view of a bag door that encompasses the invention and looking downwardly.
Figure 2:
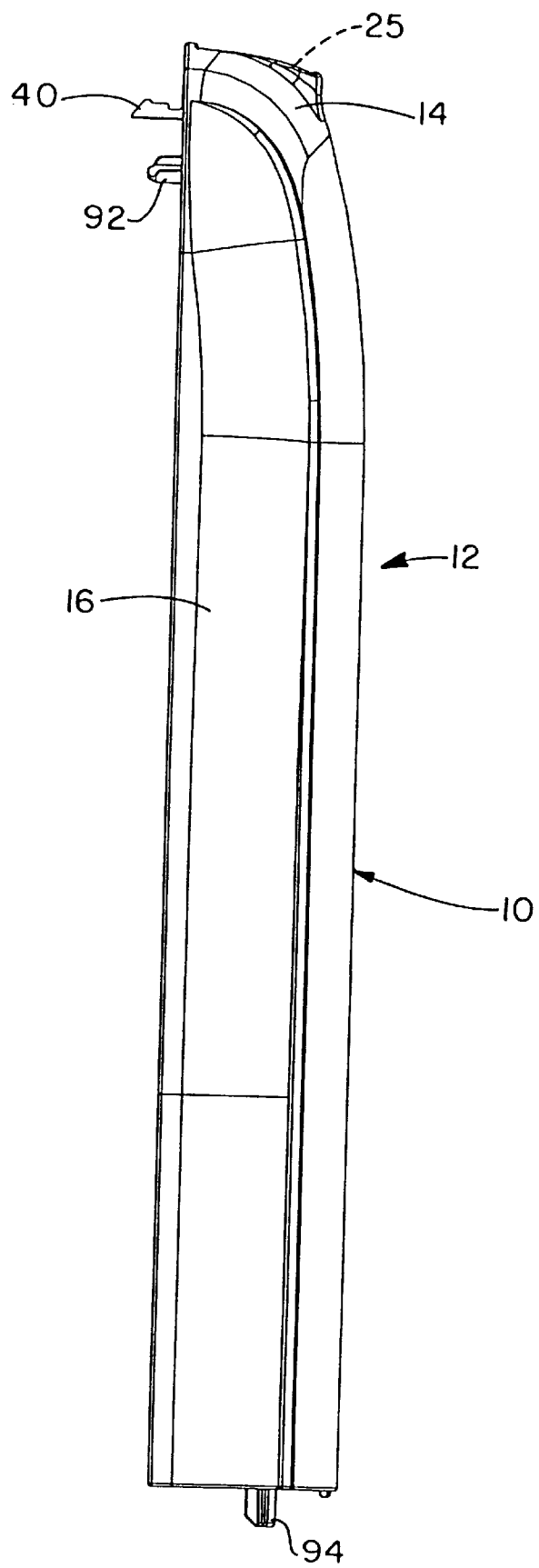
FIG. 2 is a left side elevational view thereof.
Figure 3:
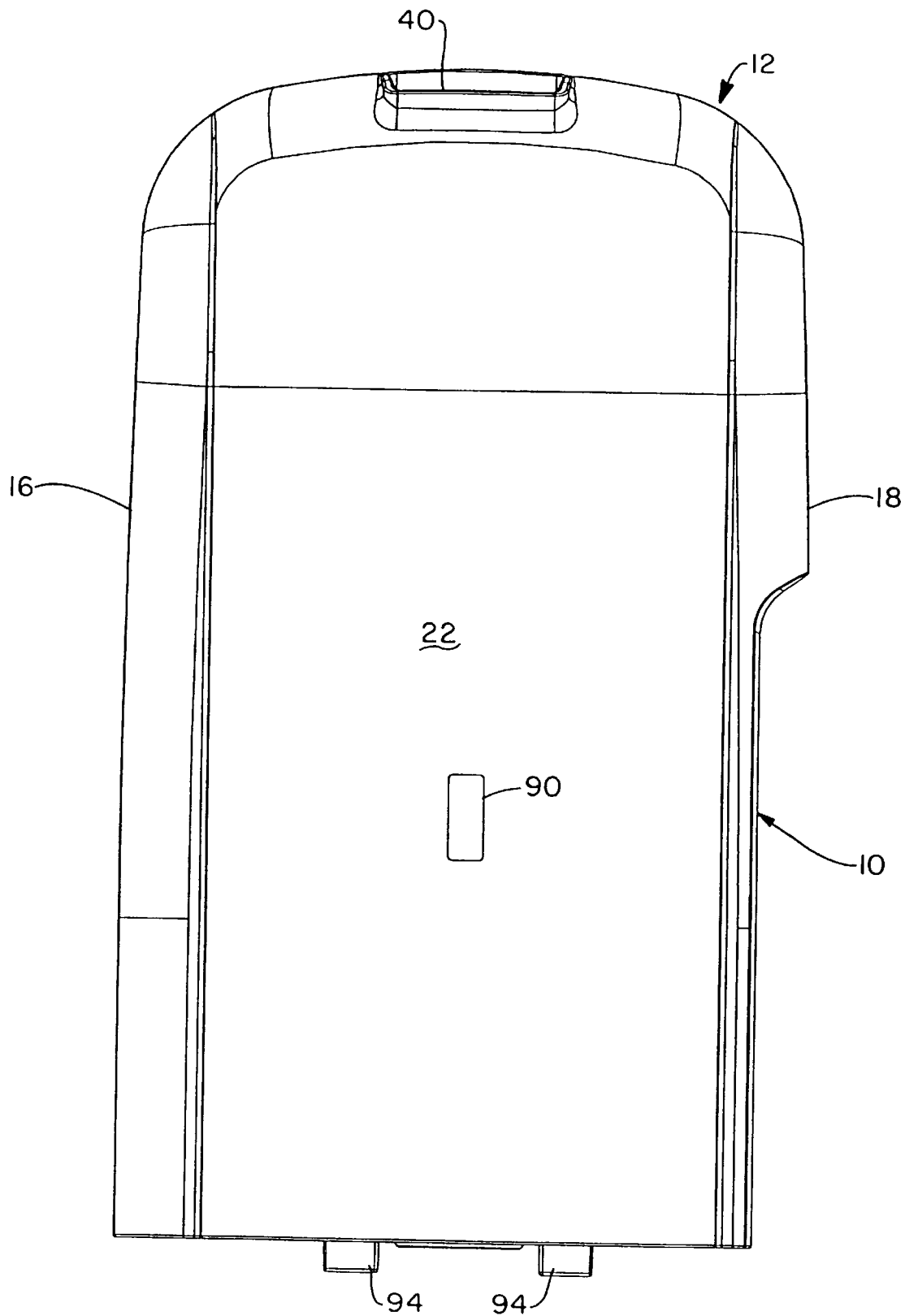
FIG. 3 is an obverse elevational view thereof.
Figure 4:
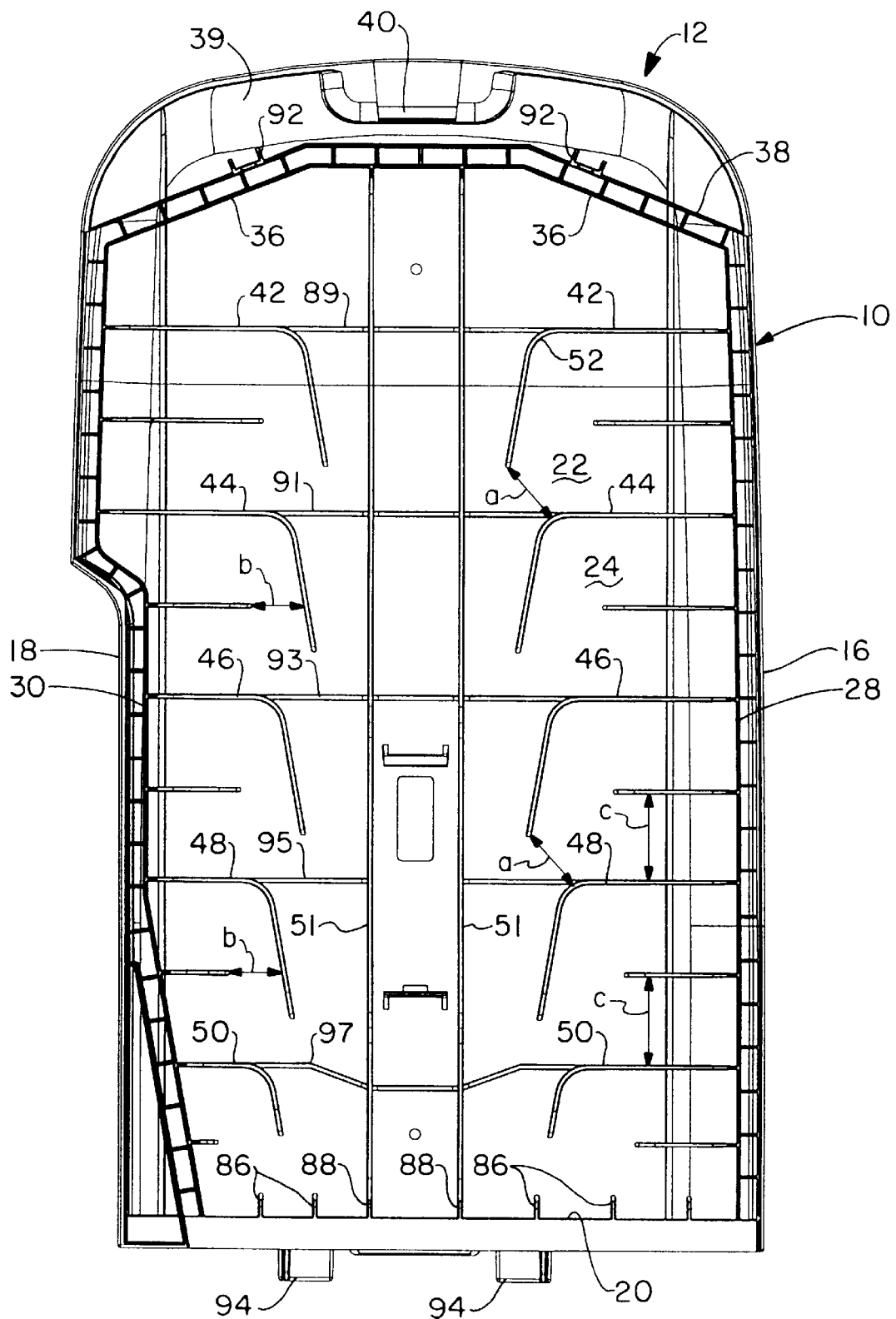
FIG. 4 is an inside elevational view thereof.
Figure 5:
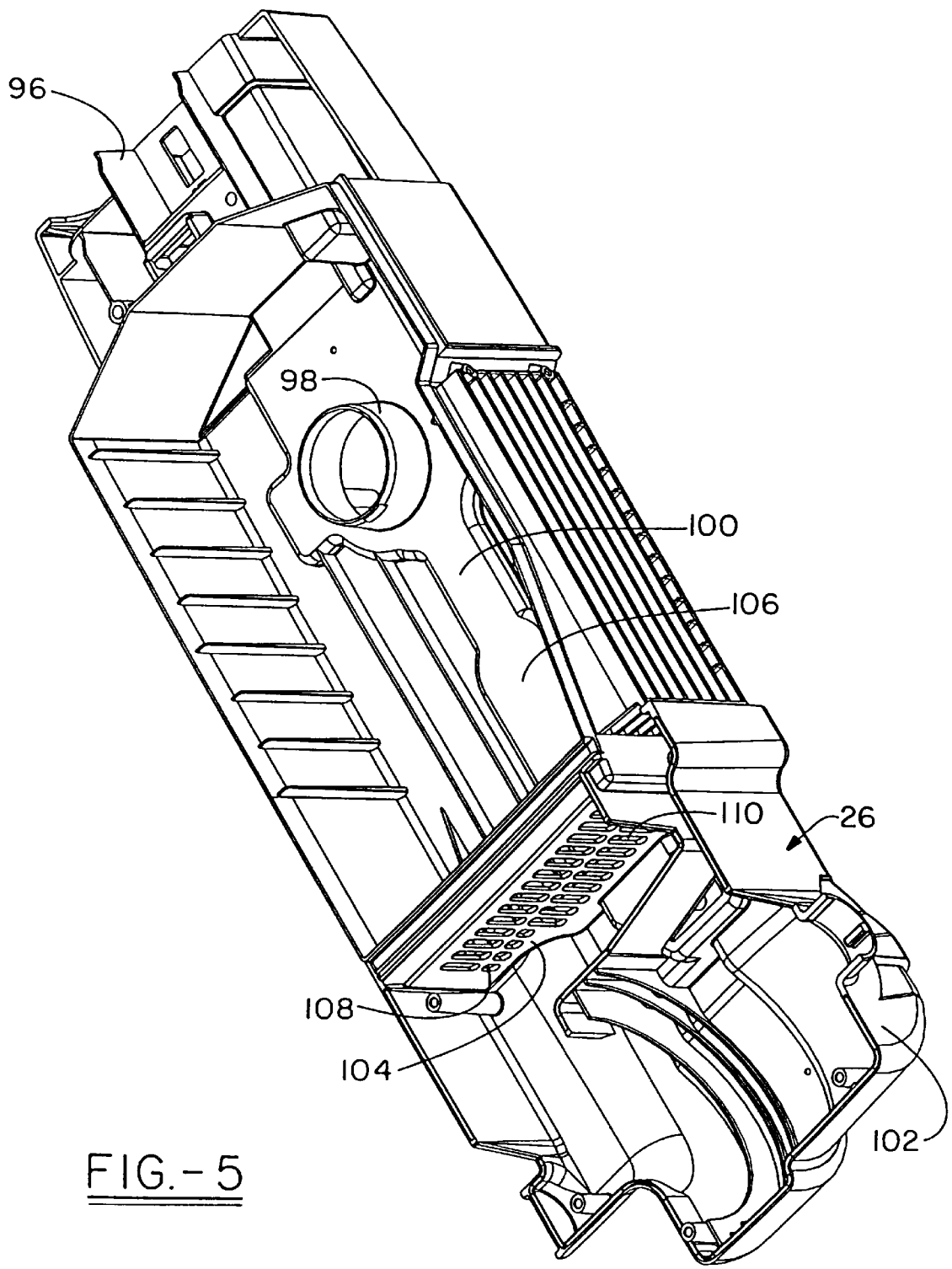
FIG. 5 is a left side inner perspective view of a hard bag utilized with the inventive bag door and looking upwardly.
Figure 6:
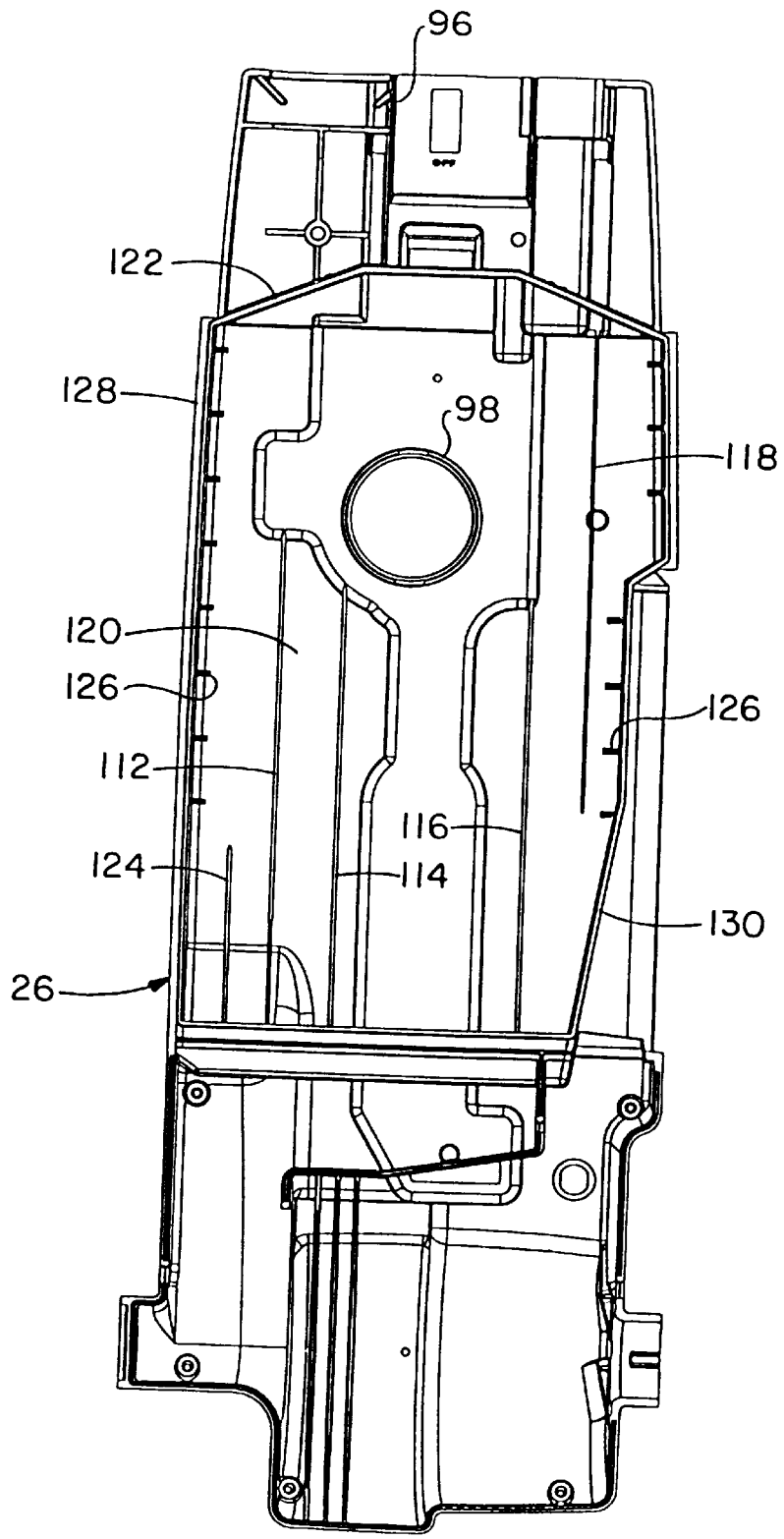
FIG. 6 is a plan view thereof.

There is shown in FIGS. 1–4, a bag door 10 of a hard bag cleaner 12 having a double arched outer top wall 14, a pair of downwardly extending outer side walls 16, 18 a flanged bottom wall 20, with a face wall 22 extending between the top wall 14, side walls 16, 18 and bottom wall 20. An inside surface 24 of face wall 22 forms a portion of the inner bag retaining surface of the volume taken up by a dirt collecting bag (not shown) mounted within a hard bag portion 26 (FIGS. 5 and 6) whose open side is conventionally bounded by the bag door 10. Bag door 10 includes in its upper double arched wall 14 a hand hold depression 25 and on the inner side of upper double arched wall 14 a deformable latch 40.

The bag door 10 includes inner vertical walls 28, 30 which are slightly inset from outer side walls 16, 18 and mirror them for their nearly total height. A series of short ribs 32, 32, etc. extend between the inner and outer walls 16, 18, 28, 30 for bag door strengthening purposes and to form an inset seat for a peripheral seal (not shown) that extends around and between the inner and outer walls 16, 18, 28, 30 and also around a top portion 34 of bag door 10 formed by inner and outer walls 36, 38 of truncated peak form which also have short ribs 32, 32, etc. disposed therebetween. The unsealed space 39 above the walls 36, 38 of the bag door 10 provides an area for the accommodation bag latch 40.

Interiorly of the walls 28, 30, 36, are a series of equally spaced, generally J-shaped turning vane ribs 42, 44, 46, 48 and 50 that are formed integrally with the interior surface 24 of hard bag 10. Each of these vane ribs extends inwardly (from both sides of the bag door 10) towards the center of the bag cavity of the hard bag cleaner 12 from adjacent the inner, vertical walls 28, 30 so as to provide directed airflow inwardly and then downwardly along the bag door 10. These ribs terminate short of a pair of medial, elongated vertically extending strengthening ribs 51, 51.

To provide their J shape, these ribs include J portions 52, 54, 56, 58 and 60, respectively, that extend curvilinearly and then angularly downwardly. This tends to turn the airflow along them downwardly. The J portions are attached to integral straight portions 62, 64, 66, 68, 70, respectively, that extend to the walls 28, 30 so that airflow direction is first inwardly towards the center of the interior surface 24 of bag door 10 and then downwardly between the inner terminations (J portions 52, 54, 56, 58 and 60) of the J-shaped turning vane ribs 42, 44, 46, 48 and 50. The straight portions 62, 64, 66, 68 and 70 of the J shaped ribs 42, 44, 46, 48, 50 shorten from the upper most straight portion 62, and then from each rib straight portion to the next so that a surmounting rib is longer than the one beneath it. This provides the J shaped turning vanes 42, 44, 46, 48 and 50 with a step wise pattern and a flow area that diverges in the downward flow direction along the bag door 10.

The straight portions 62, 64, 66, 68 and 70 of the J shaped vane ribs 42, 44, 46, 48 and 50 merge, at their outer edges, into side ribs 72, 74, 76, 78, and 80 disposed integrally along the inside faces of sides 28 and 30. Each has an outer curvilinear, feathered end 82 to smooth airflow. The side ribs 72, 74, 76, 78 and 80 extend horizontally along the inner faces of these same inner walls 28 and 30. The J shaped ribs 42, 44, 46, 48 and 50, at their inner ends each also include a curvilinear, feathered end 84 also to smooth airflow.

Between the J shaped rib vanes 42, 44, 46, 48 and 50 and also below the last J shaped vane rib 50 are disposed a series of short directing ribs 41, 43, 45, 47 and 49. These ribs, primarily, prevent bag sealing and rupture problems but also aid in airflow. They are also stepped from top to bottom so that the equal airflow paths a, a, a, and a between the J shaped ribs 42 44, 46, 48, and 50 and equal air flow paths b, b, b, b, b formed between them and their companion short directing ribs 43, 45, 47, 49 and 50 are provided and function as the open flow paths therebetween. In a similar manner equal flow paths c, c, c, c and c between one of the short ribs and its next below J-shaped rib are also provided. The air flow paths b and c are also equal to each other to smooth- air currents along the bag door 10.

The short directing ribs 41, 43, 45, 47 and 49 each include a curvilinear end 53 to feature the ends of these ribs. They also include side curved and feathered end extension rib portions 55, 57, 59, 61 and 63 like the ends of the side ribs 72, 74, 76, 78 and 80.

The outer flange of bottom wall 20 of bag door 10 also includes a series of horizontally, and vertically extending integral ribs 86, 86, 88, 88, 86, 86 that guide airflow discharged by the J-shaped ribs inwardly from the bag door 10 towards the hard bag portion 26. The ribs 86, 86, 86, 86 are discrete and unattached directly to any other ribbing in the bag door 10 while the ribs 88, 88 form integral angled continuations of medial strengthening ribs 51, 51.

The bag door 20 is completed by a nearly centered rectangular aperture 90 to serve as a mounting port for the mounting of a full bag indicator (not shown) and upper and lower alignment tabs 92, 92, 94 and 94 which help position the bag door 10 when being mounted on the hard bag portion 26. Narrow strengthening ribs 89, 91, 93, 95 and 97 also are provided between opposite, opposed J-shape vent ribs to prevent dishing of the bag door 10 when depressurized.

The hard bag portion 26 (FIGS. 5 and 6) generally includes upper structure 96 for the mounting of a cleaner handle (not shown), a bossed aperture 98 for the sealing receipt of the bag (not shown), a vertically extending inwardly projecting housing portion 100 for the nesting reception of internal electric wiring (disposed on its outer side and not shown) for the hard bag cleaner 12, and a lower motor-fan housing section 102 for the reception of the motor-fan (not shown). As is conventional, the motor-fan causes suction airflow downwardly along the interior surface bag door 10.

To this end, a louvered opening 104 is formed near the bottom of the hard bag portion 26 through which air within its upper cavity 106 is urged to flow downwardly by the motor-fan system of motor-fan housing section 102. The louvered opening 104 includes a series of ventilating slots 108 and 110 which provide confluency between the hard bag portion upper cavity 106 and the motor-fan system within the motor-fan housing section 102. The path of cleaner air flowing to discharge is not an element of this invention but is covered fully in U.S. application Ser. No. 08/780,859 filed 9 Jan. 1997 and owned by a common assignee.

The hard bag portion 26 also includes ribbing to aid in the prevention of bag sealing and to direct air flow downwardly towards louvered opening 104. A series of elongated vertical ribs 112, 114, 116 and 118 are made integral with a front wall 120 of hard bag portion 26. The first three of these ribs extends downwardly from electrical wire storing housing portion 100 and the last extends downwardly from near a top wall 122 of the hard bag portion 26. All terminate close to the level of louvered opening 104. A short lower directing rib 124 disposed outboard of the rib 112 also terminates short of the level of the louvered opening 104.

The hard bag portion 26 also includes a series of side vent ribs 126, 126, etc. disposed on and integral with a pair of opposite sides 128 and 130 of hard bag portion 26. These ribs are generally aligned with all but the two lowest ribs on each side, short directing rib 49 and the last J-shaped rib 50, both of bag door 10. These two ribs are omitted for molding considerations. There is also no side rib on the hard bag portion for the right (FIG. 1) short directing rib 43 due to a change in the angulation of the hard bag portion 26 side wall 130 at this point. These hard bag portion ribs contribute somewhat to air flow efficiency for the hard bag cleaner 12, but the hard bag portion 26, because of its many other functions, cannot be as aerodynamically sound as the bag door 12 whose primary function is as a cover and whose secondary function is as an air flow director.

Figure 7:
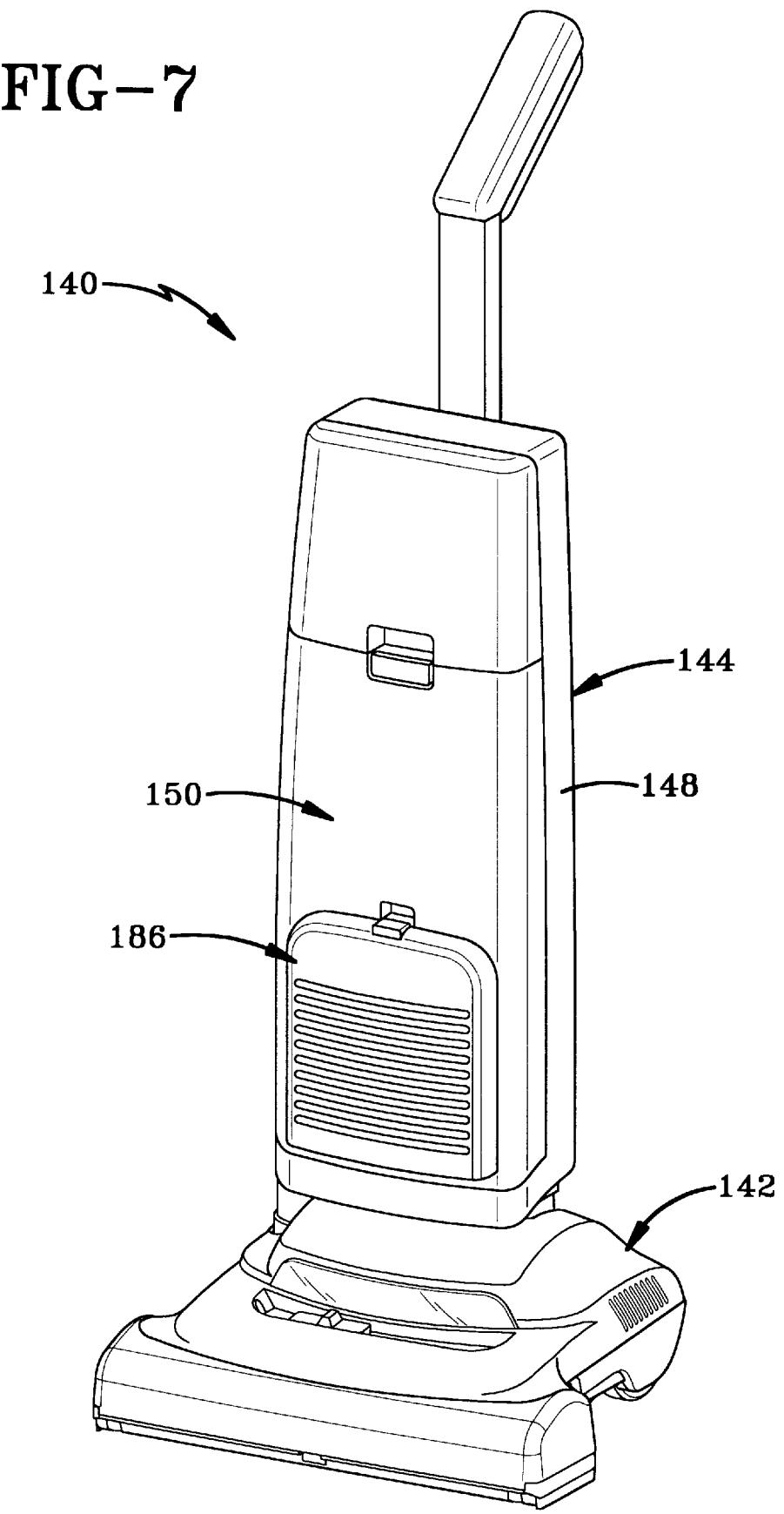
FIG. 7 is a perspective view of a direct air vacuum cleaner which includes a second embodiment of the hard bag door with air directing arrangement of the present invention.

A second embodiment of the hard bag door of the present invention is shown in FIG. 7 and is indicated generally at 150. Hard bag door 150 is shown attached to a vacuum cleaner 140 having a dirty or direct air system. Vacuum cleaner 140 generally includes a foot 142 and an upper handle 144. Upper handle 144 is formed with a bag cavity (not shown) which houses a filter bag 146 (shown in dot-dash in FIG. 14) and which is enclosed by hard bag door 150. Hard bag door 150 releasably attaches to a rear housing portion 148 of upper handle 144 and includes a slightly arcuate front wall 152 (FIG. 8) having an outer surface 153, a pair of side walls 154 integrally connected to front wall 152 by a pair of curved corners 156, a pair of angled top walls 158 and a bottom wall 160 (FIG. 11) formed with a pair of slots 161. A pair of alignment tabs 162 extend downwardly from bottom wall 160 to assist in aligning and holding bag door 150 on rear housing portion 148 when bag door 150 is assembled on upper handle 144. A generally U-shaped cut-out 164 (FIGS. 8, 9 and 10) is formed in front wall 152 between angled top walls 158 for receiving a spring biased latch 166.

Figure 9:
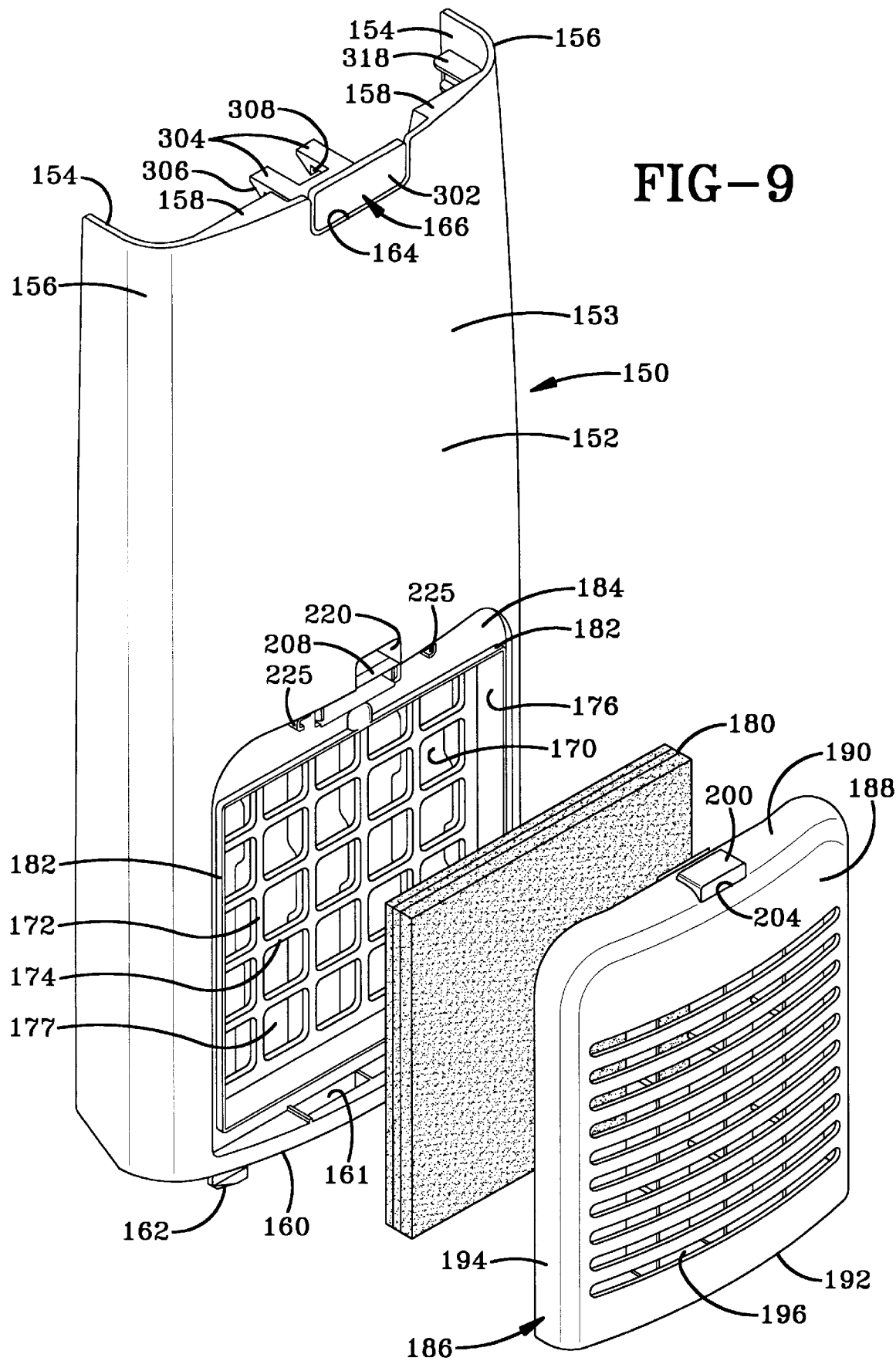
FIG. 9 is a front exploded perspective view of the hard bag door of FIG. 8.
Figure 10:
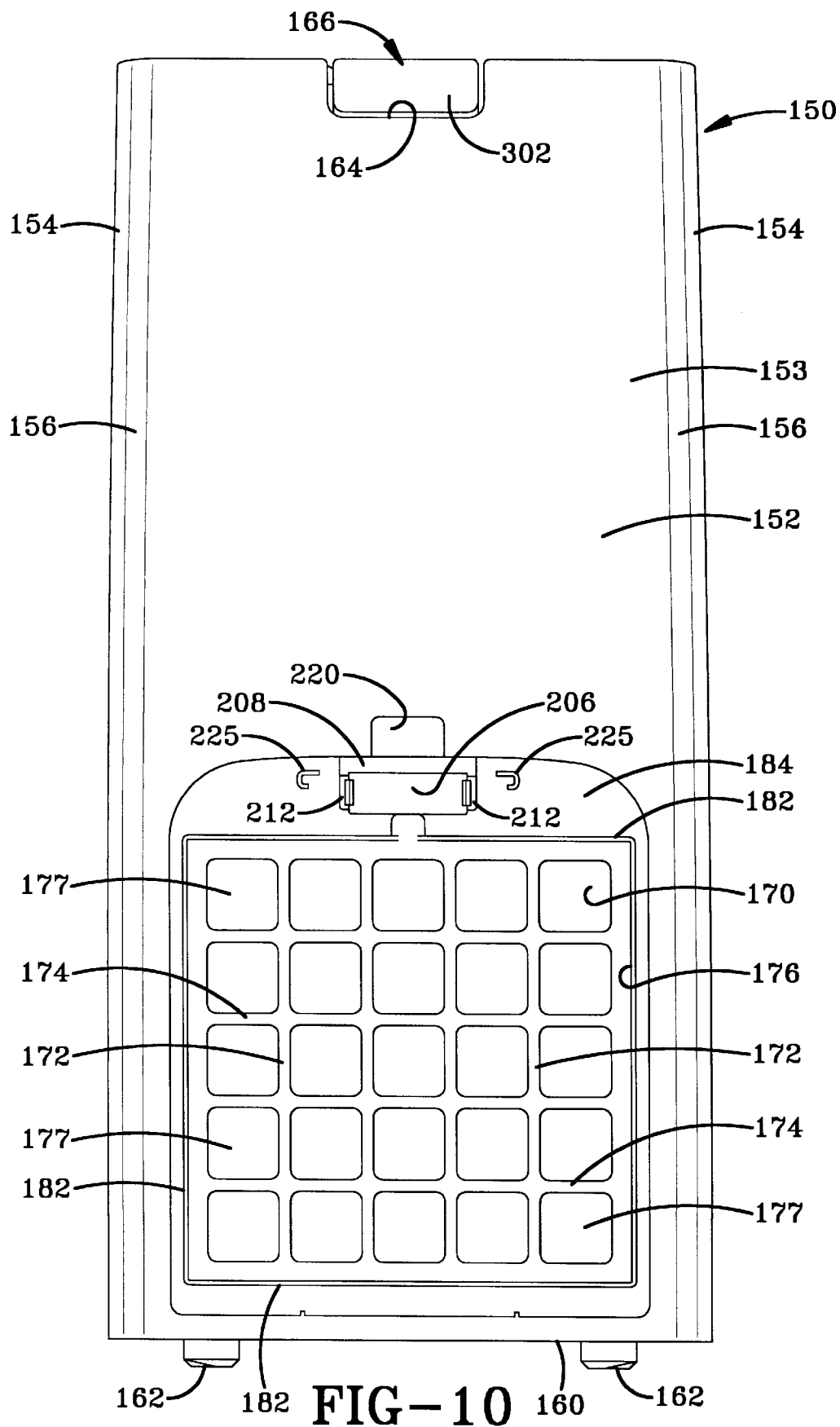
FIG. 10 is a front elevational view of the hard bag door of FIG. 9 showing the filter and the filter door removed therefrom.
Figure 11:
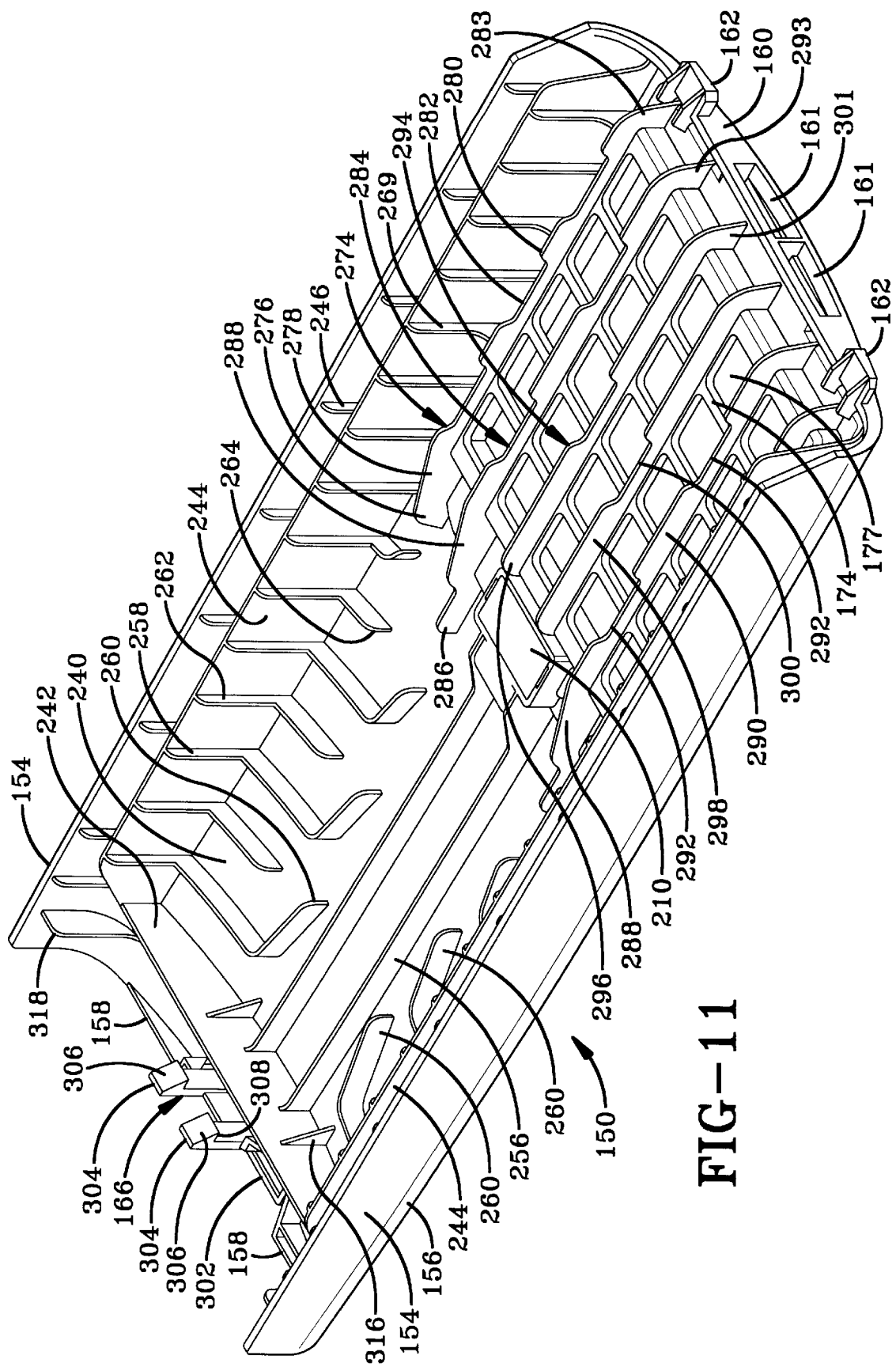
FIG. 11 is a rear perspective view of the bag door of FIG. 10.
Figure 12:
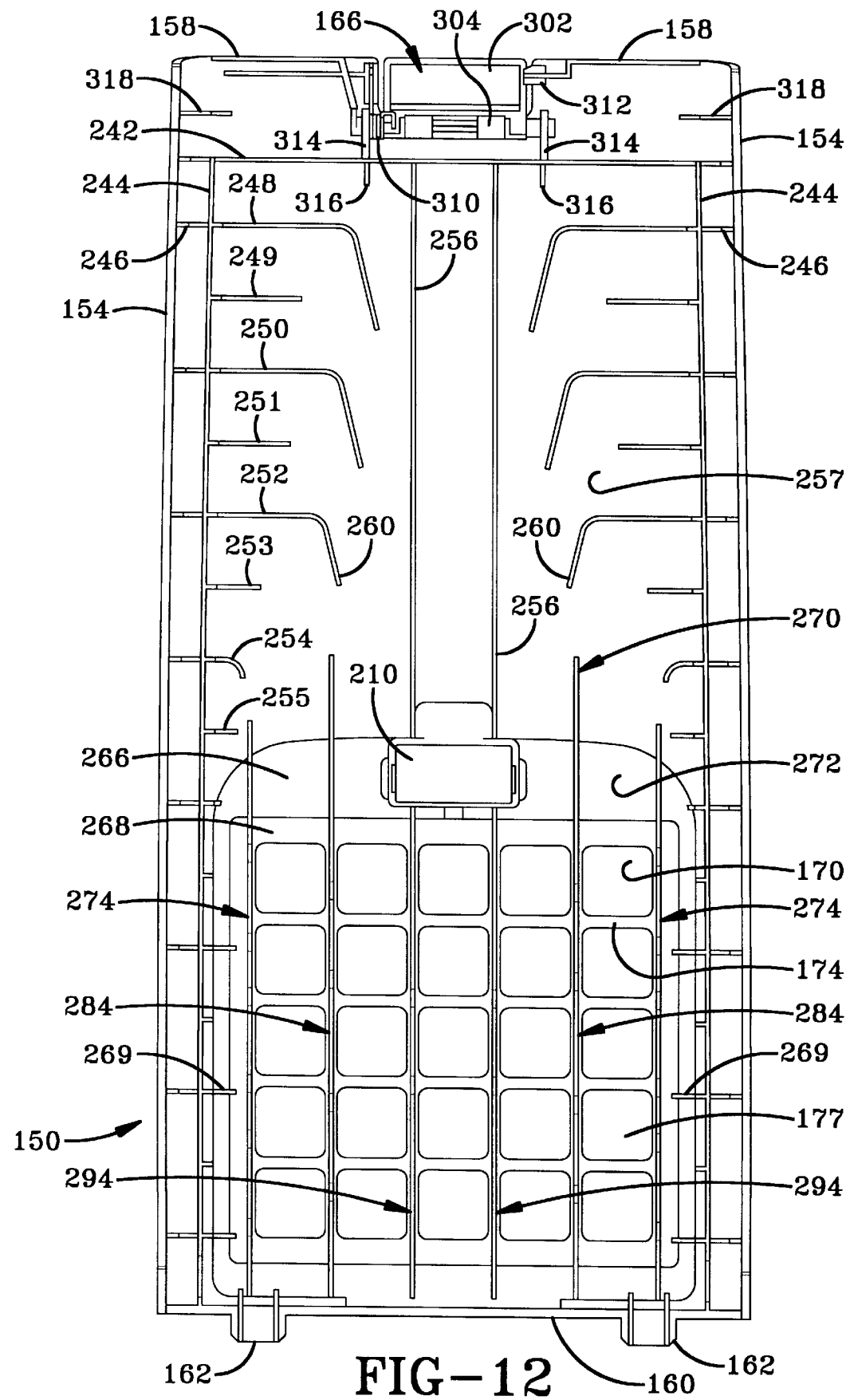
FIG. 12 is a rear elevational view of the bag door of FIG. 11.

In accordance with one of the main features of the invention, front wall 152 is formed with an exhaust opening 170 (FIGS. 9 and 10). Exhaust opening 170 is substantially square and is formed with dimensions of approximately 5½ inches by 5½ inches. A grid pattern is formed across exhaust opening 170 by a plurality of equally spaced parallel vertical and horizontal strips 172 and 174, respectively. Strips 172 and 174 are formed integrally with front wall 152 and are inset from outer surface 153 of front wall 152 forming a filter cavity 176. In the preferred embodiment, strips 172 and 174 are spaced from respective adjacent strips by approximately 15/16 inches forming substantially square exhaust holes 177 having curved or radiused corners.

Figure 8:
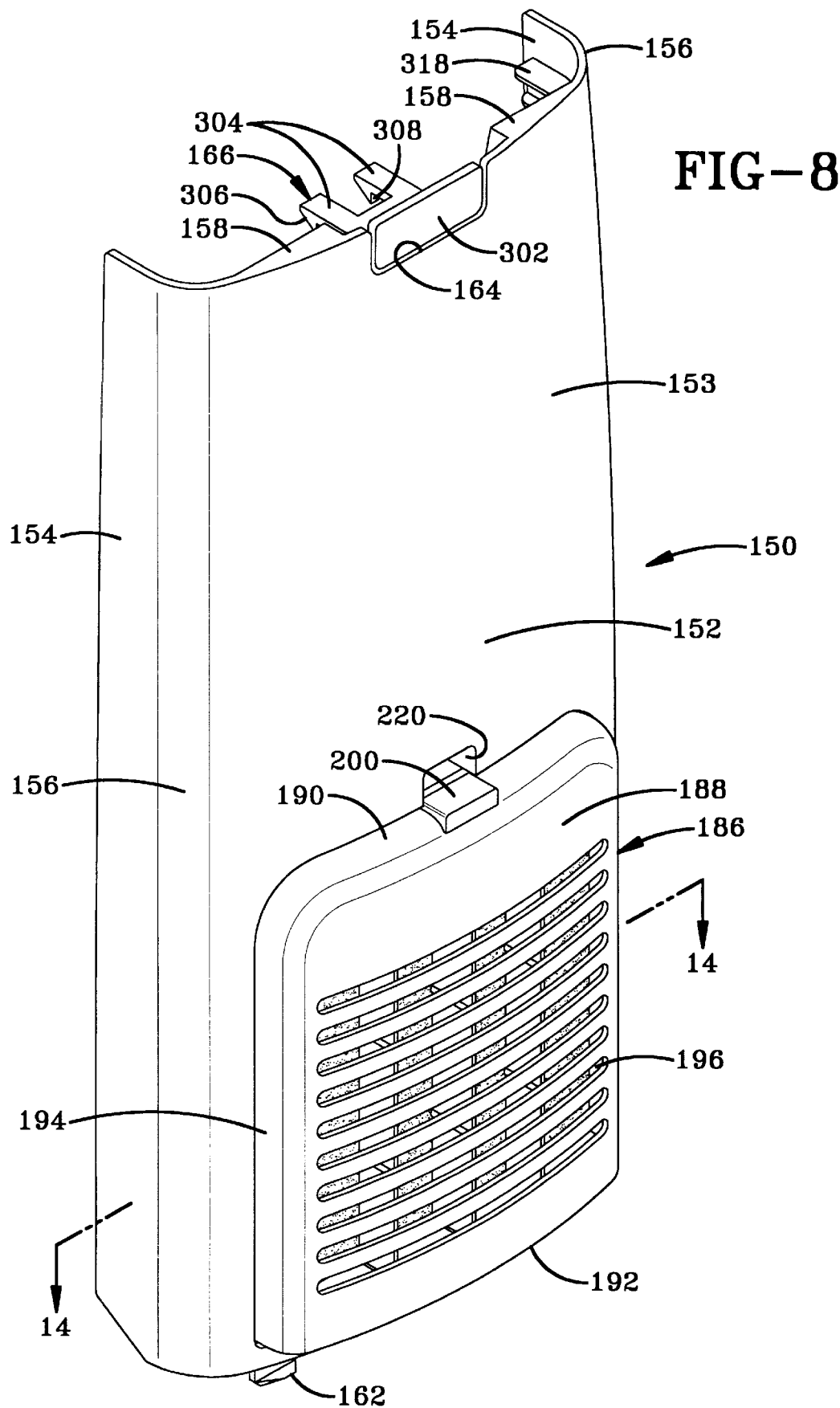
FIG. 8 is a front perspective view of the hard bag door of the vacuum cleaner of FIG. 7.
Figure 13:
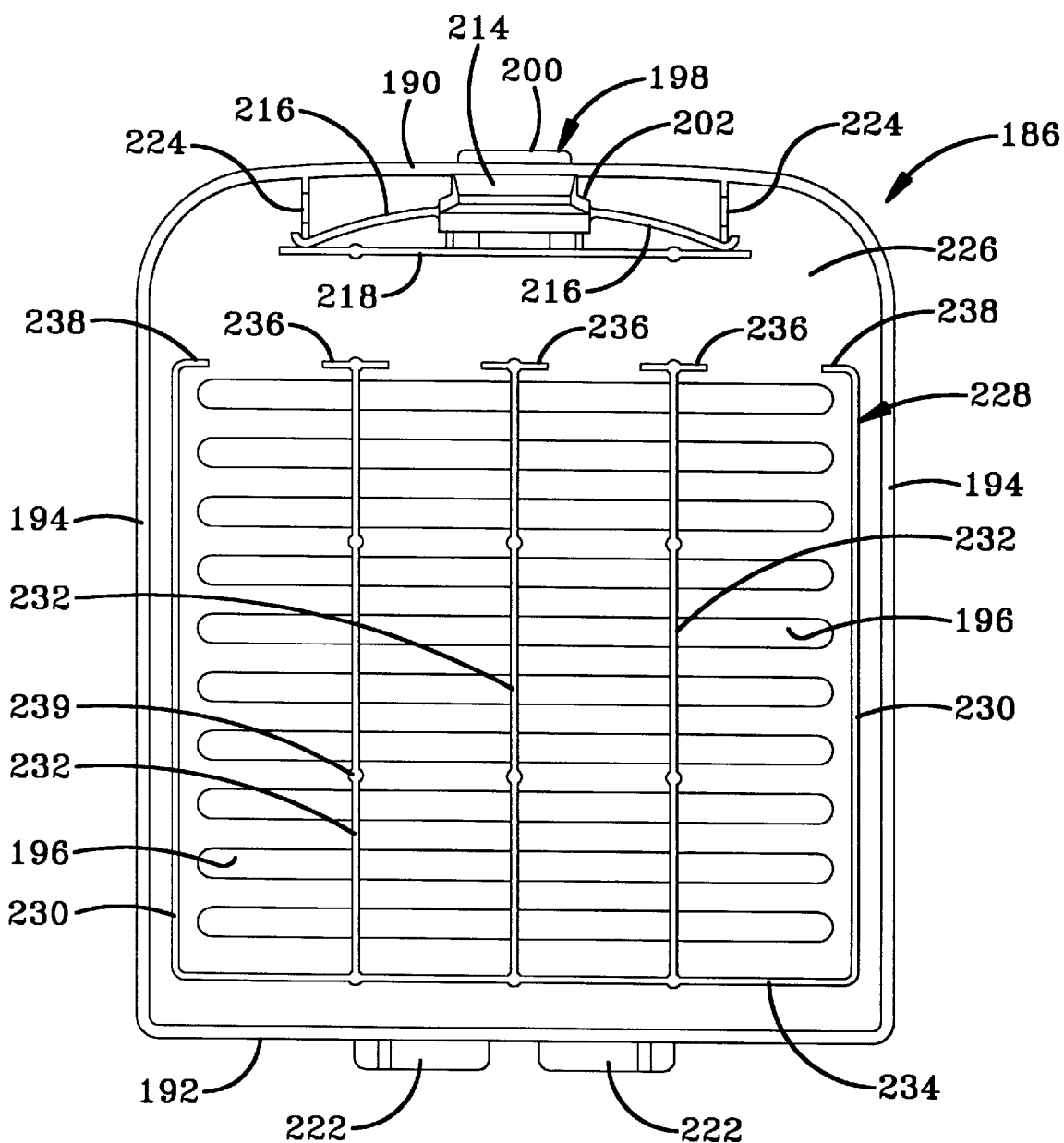
FIG. 13 is a rear elevational view of the filter door.

Filter cavity 176 is generally square in shape and receives a complementary shaped air filter 180. Air filter 180 is shown in FIGS. 8 and 13 as a three-layer member formed of a polyester batting, but may be formed of any type of filter material capable of filtering small dust particles from an airflow. A small ridge 182 extends outwardly along the periphery of filter cavity 176.

Figure 14:
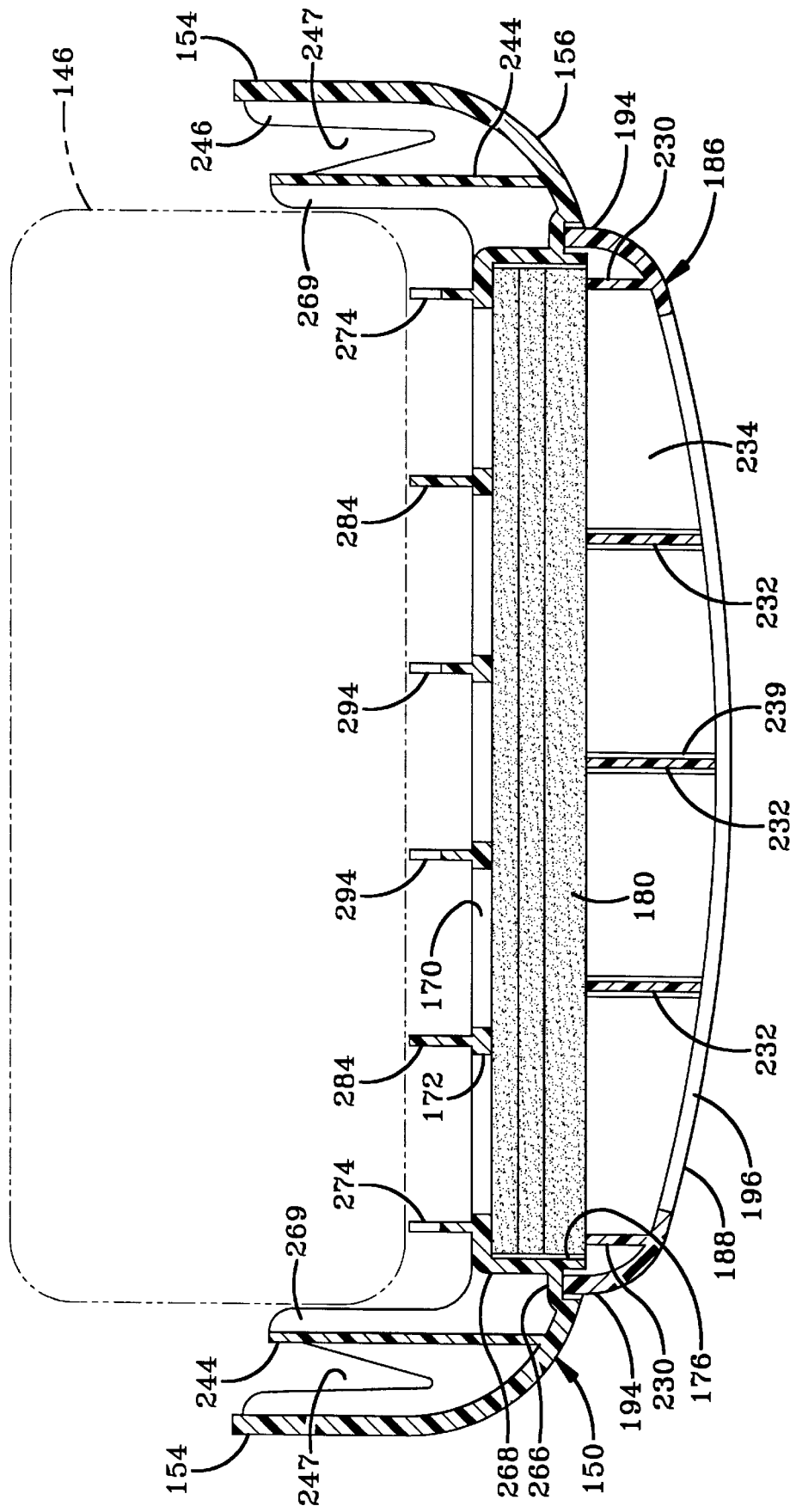
FIG. 14 is a sectional view taken along lines 14—14, FIG. 8.

An indented area 184 is formed in front wall 152 and completely surrounds filter cavity 176 and ridge 182. Indented area 184 receives a final filter door 186 which releasably attaches to front wall 152 to retain air filter 180 within filter cavity 176. Final filter door 186 includes a front wall 188, a top wall 190 (FIG. 13), a bottom wall 192 and a pair of side walls 194 extending between and formed integrally with top wall 190 and bottom wall 192. Final filter door 186 is complementary in shape to indented area 184 with the outer edge of top wall 190, bottom wall 192 and side walls 194 abutting the outer surface of indented area 184 adjacent the peripheral edge thereof (FIG. 14). A plurality of spaced parallel vent openings 196 are formed in front wall 188 of final filter door 186 and extend horizontally thereacross. Vent openings 196 allow the filtered exhaust air flowing through air filter 180 to exit the bag housing into the atmosphere.

Final filter door 186 includes a latching mechanism 198 which releasably retains final filter door 186 to hard bag door 150. Latching mechanism 198 generally includes a push button 200 and an upwardly extending latching tab 202. Push button 200 extends through an opening 204 formed in top wall 190 and is vertically slidable therein. Latching tab 202 is spaced from top wall 190 and is received within a slotted opening 206 (FIGS. 9 and 10) formed in front wall 152. Slotted opening 206 is formed completely through front wall 152 allowing a catch 208 to be easily molded over an upper portion of the opening. A plug 210 snap fits with a pair of latching shoulders 212 which are formed on each side of slotted opening 206 allowing plug 210 to block slotted opening 206 and limit the flow of air therethrough. A finger hole 220 is formed in front wall 152 directly above catch 208 for receiving a user's finger during the unlatching of latching mechanism 198.

Latching tab 202 (FIG. 13) is formed with an angled camming surface 214 which allows latching tab 202 to cam along and engage catch 208. A pair of resilient leaf springs 216 extend from each side of latching tab 202, and abut and rest on a horizontal ledge 218. Ledge 218 is formed integrally with the rear surface of front wall 188, spaced from and adjacent to top wall 190. Ledge 218 supports the outer curved ends of leaf springs 216 allowing leaf springs 216 to apply an upward biasing force on push button 200 and retain latching tab 202 in its engagement with catch 208.

A pair of alignment tabs 222 extend downwardly from bottom wall 192 of filter door 186 and are received within slots 161 of bottom wall 192 of bag door 150. A pair of rounded alignment nubs 224 extend inwardly from either side of latching mechanism 196 and are positioned directly above the curved ends of leaf springs 216. Alignment nubs 224 abut a pair of curved filter door alignment tabs 225 which extend outwardly from within indented area 184 to prevent lateral and vertical movement of filter door 186 when the filter door is attached to bag door 150.

Front wall 188 of filter door 186 has an inner surface 226 which includes a filter retaining assembly 228. Filter retaining assembly 228 includes a pair of vertically extending outer ribs 230 and three vertically extending inner ribs 232 formed integrally with a bottom rib 234. Outer ribs 230 are spaced from respective side walls 194 and bottom rib 234 is spaced from bottom wall 192. A support flange 236 extends across the top of and is formed integrally with each inner rib 218. A support flange 238 extends inwardly from the top of each outer rib 230. Each inner rib 232 is formed with a plurality of support bosses 239 which strengthen the integral connection between inner ribs 232 and front wall 188.

Bag door 150 is formed with an inside surface 240 similar to inside surface 24 of bag door 10. A top support wall 242 extends horizontally across inside surface 240 directly below latch 166. A pair of vertical walls 244 similar to vertical walls 30 of bag door 10 are inset from side walls 154 and are spaced from and parallel thereto. A plurality of short ribs 246 similar to short ribs 32 of bag door 10 extend between vertical walls 244 and side walls 154 and are formed with a V-shaped notch 247.

In accordance with another of the features of the invention, a plurality of J-shaped vane ribs 248, 250, 252, and 254 similar to J-shaped vane ribs 42, 44, 46, and 48 extend inwardly from vertical walls 244 towards the vertical center of hard bag door 150 so as to provide directed airflow inwardly and then downwardly along inside surface 240. A pair of spaced parallel strengthening ribs 256 similar to strengthening ribs 51 of bag door 10 extend vertically between the J-shaped vane ribs of each side of bag door 150. A series of short directing ribs 249, 251 and 253 are disposed between J-shaped vane ribs 248, 250, 252 and 254, with an additional directing rib 255 positioned below J-shaped vane rib 254. J-shaped vane ribs 248, 250, 252 and 254 are formed with a stepwise pattern similar to that of the J-shaped vane ribs of bag door 10 to form an expanding flow area 257 which diverges in the downward flow direction along inside surface 240 of bag door 150. Strengthening ribs 256 divide expanding flow area 257 into two substantially equal portions. Each J-shaped vane rib 248, 250, 252 and 254 merges at the outer edge thereof into a side rib 258 (FIG. 11), and is formed at its inner end thereof with a curvilinear feathered end 260. Similarly, each short directing rib 249, 251, 253 and 255 merges at the outer edge thereof into a side rib 262, and is formed at its inner end with a curvilinear feathered end 264.

Indented area 184 forms a first stepped area 266 which extends inwardly beyond inside surface 240. Likewise, filter cavity 176 forms a second stepped area 268 which extends inwardly beyond first stepped area 266. Gridded exhaust opening 170 is formed in second stepped area 268 with the grid pattern being formed by vertical strips 172 and horizontal strips 174. A plurality of side ribs 269 similar to side ribs 258 and 262 of the J-shaped vane ribs and directing ribs, respectively, extend from inner vertical walls 244. Certain of side ribs 269 are curved at their inner end and connect with second stepped area 268.

A plurality of stand-off ribs 270 extend inwardly from vertical strips 172 forming a plurality of airflow channels 272. Stand-off ribs 270 include a pair of outer stand-off ribs 274, a pair of middle stand-off ribs 284 and a pair of inner stand-off ribs 294. Outer stand-off ribs 274 include a top section 276 which extends inwardly from inside surface 240 beyond first stepped area 266 and curves into an angled section 278. Angled section 278 is angled inwardly and extends beyond second stepped area 268. A middle section 280 extends along the side of exhaust opening 162 and is formed with three notched or cut-out areas 282. Outer ribs 274 further include a bottom section 283 which curves inwardly and terminates at second stepped area 268.

Middle stand-off ribs 284 are positioned between outer ribs 274 and inner ribs 294 and include a top tab section 286 which extends inwardly from inside surface 240 to a height substantially equal to that of first stepped area 266. Top tab section 286 extends downwardly and curves inwardly into an angled section 288 similar to angled section 278 of outer stand-off ribs 274. Middle ribs 284 include a middle section 290 formed with a pair of notched or cut-out areas 292. Middle ribs 284 further include a bottom section 293 which curves inwardly and terminates at second stepped area 268.

Inner stand-off ribs 294 are substantially shorter than outer ribs 274 and middle ribs 284 and include a top section 296 which is curved downwardly from the edge of second stepped area 268 into a middle section 298. Middle section 298 is formed with a single notched or cut-out area 300. Inner ribs 294 further include a bottom section 301 which curves inwardly and terminates at first stepped area 266. Inner ribs are aligned with and form a continuation of strengthening ribs 256.

In the preferred embodiment, stand-off ribs 270 are spaced from one another by approximately 1⅛ inches and have a height of approximately ⅜ inches. The notches formed in respective stand-off ribs cut into approximately ½ the height of the ribs or approximately 3/16 inches. Stand-off ribs 270 are designed to maximize the air flow through channels 272 while minimizing the distanct that the stand-off ribs extend into the filter cavity, and have a height-to-width ratio of between 1:2 and 1:4 and preferrably approximately 1:3.

Latch 166 is pivotally mounted to inside surface 240 of bag door 150 and includes a handle tab 302 and a pair of barbed prongs 304. Barbed prongs 304 have an outer end which is formed with an angled cam surface 306 and a latching shoulder 308. Cam surfaces 306 cam against the vacuum cleaner bag housing until latching shoulders 308 snap fit with and engage a flat latching surface of the bag housing. Handle tab 302 is pivoted outwardly from the top edge thereof and is biased to the position of FIGS. 8 and 9 by a spring 310. A stop tab 312 limits the inward pivotal movement of handle tab 302 and retains the outer surface of handle tab 302 flush with front wall 152.

A pair of triangular shaped support walls 314 are formed integrally with the upper surface of top support wall 242 and inside surface 240 to pivotally support latch 166. A pair of smaller triangular support walls 316 are formed integrally with a lower surface of top support wall 242 and inside surface 240 to strength top support wall 242. A top short rib 318 extends inwardly from each side wall 154 between top support wall 242 and tapered top walls 158.

When assembled, air filter 180 is positioned within filter cavity 176 to completely cover gridded exhaust opening 170. Alignment tabs 222 of filter door 186 extend within slots 161 of bag door 150 and a force is applied to the filter door causing camming surface 214 of latching tab 202 to cam against catch 208 until latching tab 202 snap fits with the inner surface of catch 208 releasably securing filter door 186 within indented area 184. Filter door alignment nubs 224 of the filter door cooperate with alignment tabs 225 to prevent both vertical and lateral movement of filter door 186 within indented area 184. Filter 170 is sandwiched between ribs 232 of filter door 186 and strips 172 and 174 and is held therebetween by filter door 186. Alignment tabs 162 of bag door 150 extend within slots formed in rear housing portion 148 of upper handle 144, and latch 166 retains bag door 150 on the bag housing in a similar manner as that described for filter door 186.

In use, foot 142 of vacuum cleaner 140 applies suction adjacent the floor surface causing dust and dirt-laden air to flow through foot 142 and into filter bag 146. Filter bag 146 filters the dirt and debris from the airflow and is formed with sufficient porosity to permit the clean filtered air to exit the filter bag into the bag cavity. This exhaust air emitted from filter bag 146 may contain minute dust particles which are filtered from the exhaust air by air filter 180 before the exhaust air is emitted into the atmosphere, as described below.

As the exhaust air flows through the porous filter bag, J-shaped vane ribs 248, 250, 252 and 254, and directing ribs 249, 251, 253 and 255 direct the airflow downwardly along inside surface 240 of bag door 150 towards exhaust opening 170. The J-shaped vane ribs and directing ribs provide for an efficient flow of the exhaust air with the stepped pattern of the ribs providing top to bottom expanding flow area 257 between the ends of the stepped ribs and strengthening ribs 256. As the exhaust air flow along inside surface 240 within expanding flow areas 257, the exhaust air is directed into airflow channels 272 and out gridded exhaust opening 170. As the exhaust air flows through exhaust opening 170, it is filtered by air filter 180 before flowing through vent openings 196 into the atmosphere.

J-shaped vane ribs 248, 250, 252 and 254, directing ribs 249, 251, 253 and 255, strengthening ribs 256 and stand-off ribs 270 not only direct the airflow along inside surface 240 of bag door 150 but also prevent filter bag 146 from abutting against and sealing inside surface 240 which would restrict the flow of the exhaust air within the bag cavity and out the exhaust opening. The vane ribs, directing ribs, strengthening ribs and stand-off ribs provide a gap between the inside surface of the bag housing door and the filter bag which allows the exhaust air to flow along inside surface 240 and within expanding flow areas 257 and airflow channels 272.

Because the exhaust air is emitted from the filter bag from the sides and rear, as well as the front thereof, rear housing portion 148 is formed with various additional ribbing along the inner surface thereof which provides airflow gaps between the inner surface of the bag housing and filter bag 146. This additional ribbing allows the exhaust air emitted from the rear and sides of the filter bag to flow around and under the filter bag to the front thereof and out exhaust opening 170. Side ribs 269 assist in directing the airflow from the front and sides of filter bag 146 to inside surface 240 of bag door 150.

Filter bag 146 expands to an inflated configuration when the dust and dirt-laden air is being blown therein, causing the filter bag to abut stand-off ribs 270. Notched areas 282, 292 and 300 of outer ribs 274, middle ribs 284 and inner ribs 294, respectively, allow the exhaust air from the front and sides of filter bag 146 to flow laterally across air flow channels 272 and out gridded exhaust opening 170. The notched areas further allow for a substantially equalized air pressure within adjacent airflow channels 272, as the exhaust air flowing through one of the airflow channels may pass through a notched area of one of the stand-off ribs into an adjacent airflow channel having a lower pressure.

Accordingly, the hard bag door with air directing arrangement is simplified, provides an effective, safe, inexpensive, and efficient device which achieves all of the numerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the hard bag door with air directing arrangement is constructed and used, the characteristics of the construction, and the advantages, new and used for results obtained; the new and useful structures, devices, elements, arrangements, parts and combinations, are set forth in the appended claims.

We claim:

1. A hard bag portion of a vacuum cleaner apparatus including:
   a plurality of J-shaped vane ribs formed along an interior surface of the hard bag cleaner portion to guide an air flow, said J-shaped vane ribs extend inwardly from a pair of opposed sidewalls of the hard bag portion and are stepped in length from a top to a bottom of the hard bag portion to provide an expanding flow area.

2. The hard bag portion of claim 1 in which the expanding flow area is disposed medial of the interior surface of the hard bag cleaner portion and extends from the top to the bottom thereof.

3. The hard bag portion of claim 2 further including a pair of vertically extending center support ribs disposed medially on the interior surface of the hard bag portion for dividing the expanding flow area into two substantially equal portions.

4. The hard bag portion as defined in claim 3 further including short straight ribs interposed between the J-shaped vane ribs.

5. A hard bag portion of a vacuum cleaner apparatus including:
   a front wall having an interior surface and an exterior surface, said interior surface being positioned adjacent to a vacuum cleaner filter bag;
   an opening formed in the front wall which provides fluid communication between the interior and exterior surfaces;
   a removable final filter positioned on the exterior surface of the front wall over the opening for filtering exhaust air from the filter bag to permit access to the final filter without removal of the hard bag portion from the vacuum cleaner apparatus; and
   a plurality of vane ribs extending along the interior surface of the front wall for guiding the exhaust air towards the opening and final filter.

6. A hard bag portion of a vacuum cleaner apparatus including:
   a front wall having an interior surface and an exterior surface, said interior surface being positioned adjacent a vacuum cleaner filter bag;
   an opening formed in the front wall which provides fluid communication between the interior and exterior surfaces;
   a removable final filter positioned on the exterior surface of the front wall over the opening for filtering exhaust air from the filter bag;
   a plurality of vaned ribs extending along the interior surface of the front wall for guiding the exhaust air towards the opening and final filter; and
   a filter door which releasable attaches to the exterior surface of the front wall for retaining the filter over the opening.

7. A hard bag portion of a vacuum cleaner apparatus including:

a front wall having an interior surface and an exterior surface, said interior surface being positioned adjacent a vacuum cleaner filter bag;

an opening formed in the front wall which provides fluid communication between the interior and exterior surfaces;

a removable final filter positioned on the exterior surface of the front wall over the opening for filtering exhaust air from the filter bag;

a plurality of vaned ribs extending along the interior surface of the front wall for guiding the exhaust air towards the opening and final filter; and in which the vaned ribs are J-shaped.

8. The hard bag portion as defined in claim 5 in which the hard bag portion is a front bag housing door.

9. The hard bag portion as defined in claim 5 in which the front wall is formed with an upper section and a lower section; in which the opening is formed in one of the upper and lower sections; and in which the vane ribs are formed on the other of the upper and lower sections.

10. The hard bag portion as defined in claim 9 in which the vane ribs are formed on the upper section; in which the opening is formed in the lower section; and in which the vane ribs direct the exhaust air from the upper section to the lower section.

11. The hard bag portion as defined in claim 9 in which the lower section is inwardly offset from the upper section forming a step on the interior surface of the front wall and forming a filter cavity in the exterior surface of said front wall for receiving the filter.

12. The hard bag portion as defined in claim 6 in which the filter door includes ribs on an interior surface thereof for retaining the filter against the exterior surface of the wall and preventing the filter from sealing against said interior surface of the filter door.

13. The hard bag portion as defined in claim 5 in which a plurality of horizontally and vertically extending strips extend across the opening and are formed integrally with the front wall to form a grid pattern across the opening.

14. The hard bag portion as defined in claim 13 in which a plurality of vertically extending stand-off ribs are formed integrally with the vertically extending strips of the opening, said stand-off ribs extend inwardly from said vertically extending strips to guide the exhaust air through the opening and retain the filter bag in a spaced relationship thereto.

15. The hard bag portion as defined in claim 14 in which the stand-off ribs are spaced from one another forming airflow channels therebetween, said airflow channels having a channel width.

16. The hard bag portion as defined in claim 15 in which each standoff rib is formed with a notched area, said notched area allows the exhaust air to flow laterally across said stand-off ribs.

17. The hard bag portion as defined in claim 16 in which the notched areas are cut into approximately ½ of a height of the stand-off ribs.

18. The hard bag portion defined in claim 17 in which the ratio of the height of the stand-off ribs to the channel width formed between adjacent stand-off ribs is between 1:2 and 1:4 inclusive.

19. The hard bag portion as defined in claim 17 in which the J-shaped vane ribs are stepped in length from a top of the hard bag portion to a bottom of the hard bag portion to form an expanding flow area.

20. The hard bag portion as defined in claim 17 further including short straight directing ribs interposed between the J-shaped vane ribs.

21. The hard bag portion defined in claim 5 in which the interior surface of the front wall encloses a bag cavity formed in the vacuum cleaner apparatus.

22. The hard bag portion defined in claim 5 in which a filter cavity is formed in the exterior surface of the front wall for receiving the final filter.

* * * * *